Aug. 25, 1925.
J. LAKE, JR
1,550,825
BRACKET BOX FOR ELECTRICAL INDICATING INSTRUMENTS
Filed May 15, 1922
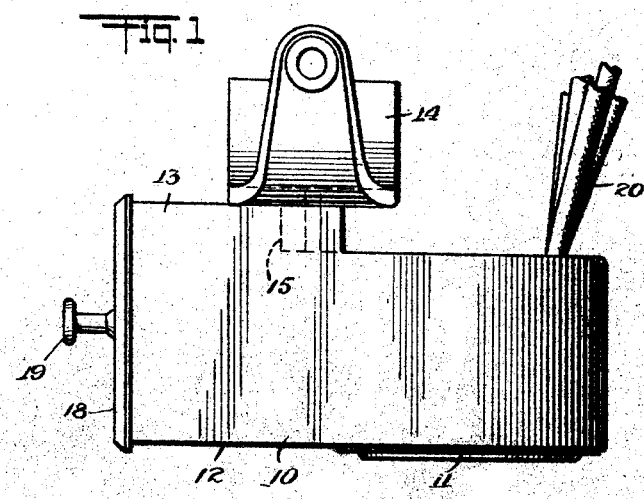
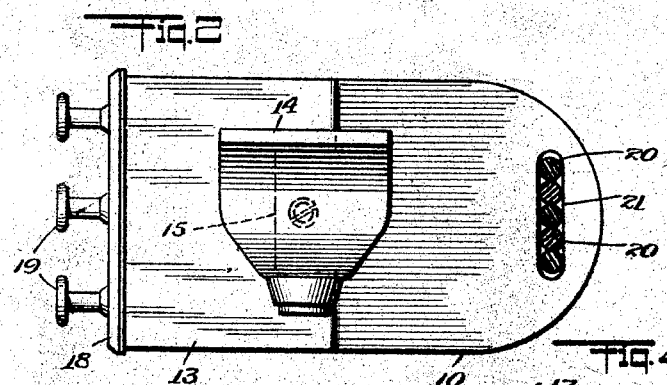
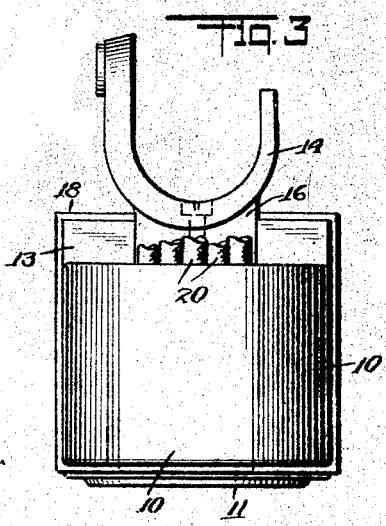
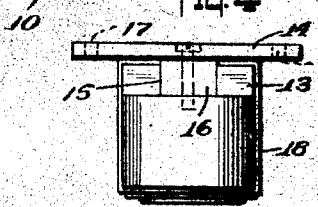
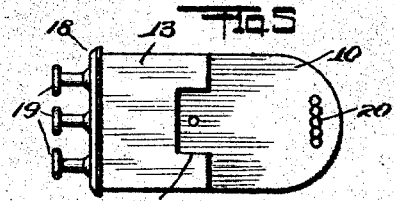
INVENTOR
James Lake Jr.
BY
ATTORNEY Patented Aug. 25, 1925.

1,550,825

UNITED STATES PATENT OFFICE.

JAMES LAKE, JR., OF BROOKLYN, NEW YORK, ASSIGNOR TO GEORGE G. ERB, OF NEW YORK, N. Y.

BRACKET BOX FOR ELECTRICAL INDICATING INSTRUMENTS.

Application filed May 15, 1922. Serial No. 560,870.

*To all whom it may concern:*

Be it known that I, JAMES LAKE, Jr., a citizen of the United States, and a resident of the city of New York, borough of Brooklyn, in the county of Kings and State of New York, have invented certain new and useful Improvements in Bracket Boxes for Electrical Indicating Instruments, of which the following is a full, clear, and exact description.

This invention relates to bracket boxes which are used to contain various indicating instruments, and in particular to a means for maintaining said boxes in position on any suitable part of a machne or vehicle.

The particular object of my invention is the provision, in conjunction with a box of this character, of means for using different types of bracket members with the box in order to attach the same to different parts of the vehicle to suit the convenience of the user.

This invention is an improvement over that shown and described in my Patent #1,330,196, dated February 10, 1920.

*Drawings.*

Figure 1 is a side view of an instrument case or housing constructed and arranged in accordance with my invention, a particular type of bracket member being shown applied thereto.

Figure 2 is a top plan view of the casing and bracket as seen in Figure 1.

Figure 3 is an end view of the casing and bracket, the means for attaching the bracket to the casing being clearly shown.

Figure 4 is a view similar to Figure 3 only on a reduced scale and showing the application of a different form of bracket to the instrument casing.

Figure 5 is a top plan view of the casing as seen in Figure 4, the bracket being omitted to show the recess in said casing.

*Description.*

As seen in the drawings, the box or casing 10 is substantially rectangular in shape, one end thereof being circular to conform to the shape of an electric ammeter or other instrument 11, which is inserted through a suitable opening in the front face 12 of the casing.

The rear of the casing is extended as at 13 to provide a rest for a suitable bracket 14 held in a recess 15 formed in the extended portion 13 through the medium of a boss 16 formed integral with said bracket.

The recess 15 is provided at the approximate center of the casing 10 so that the latter will be somewhat balanced thereon and the whole appear symmetrical, the bracket boss 16 being retained in the recess 15 by a screw passing through said boss and entering the bottom wall of said recess.

The bracket shown in Figures 1, 2 and 3 may be formed to engage any suitable projection on the vehicle, while the one illustrated in Figures 4 and 5 is for use against a flat surface to which it may be attached by screws or rivets adapted to extend through the openings 17 in the bracket.

The casing 10 is closed at its end with a plate 18 through which project the usual operating buttons 19. The wires 20 leading from the instrument pass out through an opening 21 in the casing through which they pass closely together, their connection with the instrument being within the casing renders them weatherproof.

It is evident then, that a plurality of brackets may be used depending upon where the casing is to be placed. This does away with the necessity of casting an instrument case for every particular form of bracket. The brackets are all interchangeable, as their bosses 16 are the same size and therefore all fit into the recess 15 of the casing.

Claim:

The combination with an instrument casing having a flat rear wall provided with a lateral rearwardly thickened portion extending from one end thereof to the transverse center thereof and with a recess formed in the edge of a depth corresponding to the depth of said thickened portion, of a support engaging bracket, and a boss on said bracket corresponding to the configuration of said recess for engagement therein and against the rear wall of said casing at the bottom of the recess, said bracket and boss having a bore therethrough, and a fastening screw extending through said bore for engagement with the rear wall of said casing for securing said bracket to the casing.

JAMES LAKE, JR.